(12) United States Patent
Roesch (10) Patent No.: US 8,181,901 B2
(45) Date of Patent: May 22, 2012

(54) FAST HYBRID HELICOPTER WITH LONG RANGE AND PROPORTIONAL DRIVE TO THE ROTOR AND THE PROPELLER

(75) Inventor: Philippe Roesch, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 914 days.

(21) Appl. No.: 12/125,105

(22) Filed: May 22, 2008

(65) Prior Publication Data

US 2009/0321554 A1 Dec. 31, 2009

(30) Foreign Application Priority Data

May 22, 2007 (FR) ...................................... 07 03613

(51) Int. Cl.
*B64C 27/14* (2006.01)
(52) U.S. Cl. ........................................ 244/6; 244/17.19
(58) Field of Classification Search ........... 244/6, 17.11, 244/60, 17.19, 17.21; 416/29, 126
See application file for complete search history.

(56) References Cited

U.S. PATENT DOCUMENTS

| | | | | |
|---|---|---|---|---|
| 2,653,778 A | * | 9/1953 | Bennett et al. ...................... | 244/6 |
| 2,665,859 A | * | 1/1954 | Papadakos ..................... | 244/7 R |
| 2,925,867 A | * | 2/1960 | Cotton et al. .................... | 416/26 |
| 2,940,693 A | * | 6/1960 | Hislop ........................ | 244/17.11 |
| 3,385,537 A | * | 5/1968 | Lichten et al. ..................... | 244/6 |
| 3,458,160 A | * | 7/1969 | Marchetti ........................... | 244/6 |
| 3,698,666 A | | 10/1972 | Monti | |
| 4,276,744 A | * | 7/1981 | Pisano ............................. | 60/791 |
| 4,783,023 A | * | 11/1988 | Jupe ................................... | 244/6 |
| 4,936,748 A | * | 6/1990 | Adamson et al. ............. | 416/123 |
| 2002/0011539 A1 | | 1/2002 | Carter, Jr. | |

FOREIGN PATENT DOCUMENTS

FR 2769285 4/1999

OTHER PUBLICATIONS

Search report in corresponding French Application No. 0703613.

* cited by examiner

*Primary Examiner* — Galen Barefoot
(74) *Attorney, Agent, or Firm* — Brooks Kushman P.C.

(57) ABSTRACT

A hybrid helicopter (1) includes firstly an airframe provided with a fuselage (2) and a lift-producing surface (3), together with stabilizer surfaces (30, 35, 40), and secondly with a drive system constituted by:
- a mechanical interconnection system (15) between firstly a rotor (10) of radius (R) with collective pitch and cyclic pitch control of the blades (11) of the rotor (10), and secondly at least one propeller (6) with collective pitch control of the blades of the propeller (6); and
- at least one turbine engine (5) driving the mechanical interconnection system (15). The device is remarkable in that the outlet speeds of rotation of the at least one turbine engine (5), of the at least one propeller (6), of the rotor (10), and of the mechanical interconnection system (15) are mutually proportional, the proportionality ratio being constant.

26 Claims, 2 Drawing Sheets

FAST HYBRID HELICOPTER WITH LONG RANGE AND PROPORTIONAL DRIVE TO THE ROTOR AND THE PROPELLER

The present invention relates to a rotorcraft with long range and a high forward speed in cruising flight.

BACKGROUND OF THE INVENTION

More particularly, the invention relates to a hybrid helicopter relating to an advanced concept for a vertical takeoff and landing aircraft (VTOL).

This advanced concept combines, at reasonable cost, the efficiency in vertical flight of a conventional helicopter with the high travel speed performance made possible by installing modern turbine engines.

In order to understand clearly the object of the invention, it is appropriate to recall the main heavier-than-air craft correspond to airplanes and to rotorcraft.

The term "rotorcraft" is used to designate any vehicle in which all or some of its lift is provided by one or more propellers of substantially vertical axis and large diameter, referred to as rotors or as rotary wings.

There are several distinct types in category of rotorcraft.

Firstly there is the helicopter in which at least one main rotor driven by a suitable power plant provides both lift and propulsion. A helicopter is capable of hovering flight, remaining at a fixed point in three dimensions, and it can take off and land vertically, and it can move in any direction (forwards, rearwards, sideways, upwards, downwards). The great majority of rotorcraft produced in the world are helicopters.

Then there is the autogyro (first made by La Cierva) which is a rotorcraft in which the rotor does not receive power, but rotates in autorotation under the effect of the speed of the rotorcraft. Propulsion is provided by a turbine engine or by a propeller having an axis that is substantially horizontal in forward flight and that is driven by a conventional engine. That configuration is not capable of vertical flight unless the rotor is initially set into rotation by an auxiliary device enabling the rotor to be caused to rotate faster: an autogyro is therefore not capable of performing hovering flight but only of moving upwards or downwards on flightpaths having very steep slopes. It is, so to speak, an airplane with a wide range of flying speeds that is not liable to stalling, and that can use short runways.

A gyrodyne is a rotorcraft intermediate between the helicopter and the autogyro in which the rotor provides lift only. The rotor is normally driven by an engine installation during stages of takeoff, hovering or vertical flight, and landing, like a helicopter. A gyrodyne also has an additional propulsion system that is essentially different from the rotor assembly. In forward flight, the rotor continues to provide lift, but only in autorotation mode, i.e. without power being transmitted to said rotor. The Fairey Jet Gyrodyne is an embodiment of this concept.

Several other novel formulae have been studied to a greater or lesser extent, and some have given rise to practical embodiments.

In this respect, mention can be made of the compound rotorcraft that takes off and lands like a helicopter and that cruises like an autogyro: its rotor, driven in autorotation motion by the forward speed of the rotorcraft provides some of the lift, the remainder being provided by an auxiliary wing, a tractor propeller of substantially horizontal axis generates the force needed to move in translation. As example, mention can be made of the experimental Farfadet SO 1310 compound rotorcraft having its rotor propelled by reaction in the takeoff/landing configuration and rotating under autorotation in the cruising configuration, propulsion then being provided by a propeller. The vehicle is provided with two separate turbines for actuating the rotor and the propeller.

The convertible rotorcraft constitutes another particular rotorcraft formula. This term covers all rotorcraft that change of configuration in flight: takeoff and landing in a helicopter configuration; and cruising flight in an airplane configuration, e.g. with two rotors being tilted through about 90° to act as propellers. The tilting rotor concept has been implemented in the Bell Boeing V22 Osprey, for example.

Of those various kinds of rotorcraft, the helicopter is the simplest, and as a result it has been successful in spite of having a maximum horizontal speed in translation of about 300 kilometers per hour (km/h) which is small and less than that which can be envisaged by compound rotorcraft and convertible type formulae that are technically more complex and more expensive.

Under such conditions, improvements to the above formulae have been proposed for increasing rotorcraft performance, but without that leading to solutions that are complicated, difficult to manufacture and to operate, and consequently expensive.

Thus, patent G-B-895 590 discloses a vertical takeoff and landing aircraft comprising the following main elements:
- a fuselage and two half-wings, one on either side of the fuselage),
- a horizontal stabilizer and rudder control,
- at least four interconnected drive units,
- a main rotor,
- at least two reversible pitch propellers that are variable relative to each other, and
- means under pilot control for transmitting drive power continuously or from time to time to the rotor and to the propellers.

Under such circumstances, the main rotor is rotated by the power units during takeoff and landing, during vertical flight, and for horizontal flight at low speed. At high speed, the rotor turns freely without power being transmitted thereto, like an autogyro, the rotor shaft being fitted with decoupling means.

U.S. Pat. No. 3,385,537 discloses a helicopter comprising in conventional manner a fuselage, a main rotor, and a tail rotor. The main rotor is rotated by a first power unit. That vehicle is also fitted with two other engines, each engine being disposed at the outermost end of two half-wings disposed on either side of said fuselage. The patent relates to automatically varying the pitch of the blades as a function of the acceleration exerted on the vehicle while maneuvering or during gusts of wind, for example, so as to maintain a proper distribution of lift between the rotor and the half-wings. As a result, the corresponding device contributes to increasing the horizontal speed of the rotorcraft by reducing the risks of the blades stalling, constituting sources of variation and damage to the mechanical assemblies and structures.

U.S. Pat. No. 6,669,137 describes an aircraft fitted with a rotary wing for operating at very low speed. At high speeds, the rotary wing is slowed down and then stopped, with lift then being produced by a scissors wing. At maximum speeds, the rotary wing and the scissors wing are put into a determined configuration so as to form a kind of swept-back wing.

The rotorcraft according to U.S. Pat. No. 7,137,591 has a rotor rotated by a power unit, in particular for takeoff, landing, and vertical flight. A thrust propeller is used in cruising flight, with lift being generated by autorotation of the rotor, possibly with assistance from an auxiliary wing. Furthermore, the rotor mast can be tilted forwards and rearwards a little so as to eliminate the effects due to changes in the attitude of the fuselage that might harm the performance of the rotorcraft by increasing its aerodynamic drag.

U.S. Pat. No. 6,467,726 discloses a rotorcraft comprising at least:
- a fuselage,
- two high wings,
- at least four propulsion propellers,
- at least two main rotors without cyclic pitch control, each connected to one of the two wings,
- two engines, and the associated means for transmitting power to the rotors and to the propellers, and
- a collective pitch control system for each propeller and for each rotor.

In cruising flight, lift is developed by the two wings, so that the lift due to the rotor is eliminated either by decoupling the rotor via a clutch provided for this purpose, or by appropriately setting the collective pitch of the rotor blades.

U.S. Pat. No. 6,513,752 relates to a rotorcraft comprising:
- a fuselage and a wing,
- two variable-pitch propellers,
- a rotor with "end" masses,
- a power source driving the two propellers and the rotor,
- control means for adjusting the pitch of the propellers so that:
  - in forward flight the thrust from the propellers is exerted towards the front of the rotorcraft, and
  - in hovering flight, the antitorque function is provided by one propeller providing thrust towards the front and the other propeller towards the rear of the rotorcraft, with the rotor being driven by the power source,
- the power source comprises an engine and a clutch that, by disconnecting the rotor from the engine, enables the rotor to turn faster than an outlet from said engine, because of the above-mentioned masses.

It is also specified that the clutch permits autogyro mode in forward flight. In addition, a power transmission gearbox disposed between the power source and the propellers enables said propellers to operate at a plurality of speeds of rotation relative to the speed of an outlet from said power source.

In the prior art, it is appropriate finally to cite patent application US-2006/0269414 A1, which deals with the particular problem of improving the performance of a helicopter both during vertical flight and during cruising flight. A high speed of rotation for the rotor is then desired during vertical, flight in order to increase lift, whereas in cruising flight, said speed of rotation can be reduced while increasing the forward speed of the helicopter.

Consequently, the invention of patent application US-2006/0269414 A1 refers more precisely to a main gearbox associated with a second power gearbox driven by the engine installation. The second gearbox includes a clutch device which, when engaged, entrains the main gearbox at a first speed of rotation, with disengagement communicating a second speed of rotation thereto that is lower than the first speed of rotation. Naturally, the main gearbox drives the rotor(s).

Nevertheless, from the above considerations, it can be seen that technical solutions that tend to improve the performance of a rotorcraft are based essentially on the following proposals:
- operating the rotor at two distinct speeds of rotation relating firstly to vertical flight and secondly to cruising flight, by means of a drive system with variable speed ratios between, the engine installation, the rotor, the propeller(s), and the various component elements of the drive system.
- operating the rotor in autogyro mode during cruising flight: the rotor rotates without driving power being delivered, and then provides some or all of the lift of the rotorcraft, but also leads to drag that nevertheless leads to a loss of power because of a low lift/drag ratio, while in contrast the rotor of a helicopter propels the rotorcraft in the direction desired by the pilot.

In particular, it is observed that the operation of a rotor in autorotation like an autogyro during cruising flight makes it necessary in principle to disconnect the shaft for driving rotation of the rotor from the entire power transmission system.

Consequently, this separation is obtained by means such as a clutch having the sole function of preventing the rotor being rotated by the power source(s), and to do so only during the transition from vertical flight to cruising flight.

A device of that type therefore implies additional weight and cost, and constitutes a penalty in terms of safety.
- Stopping the rotor and reconfiguring it, e.g. a three-blade rotor stopped in a particular configuration serves as a swept-back wing for flight at a high forward speed, or indeed, after stopping, it is possible to envisage folding the rotor over the fuselage during a rotorcraft-to-airplane transition stage.

It can be understood that those solutions complicate the technical implementation and contribute to increasing weight, and thus to increasing installed power and consequently expense but without that achieving an optimized vehicle.

OBJECTS AND SUMMARY OF THE INVENTION

An object of the present invention is to propose a hybrid helicopter, also sometimes referred to below as a "vehicle", that makes it possible to overcome the above-mentioned limitations.

Preferably, the hybrid helicopter must be capable of performing missions effectively over long periods of vertical flight and also of performing cruising flight at high speed, while also enabling long ranges to be used.

In this respect, the various examples of performance and numerical data correspond to concrete and illustrative applications, but should not under any circumstances be considered as being limiting.

Under such circumstances, a typical mission corresponds for example to transporting 16 passengers at 220 knots (kt) in a vehicle having a weight of about 8 metric tonnes (t) on takeoff over a distance of 400 nautical miles (n.miles) at an altitude of 1500 meters (m) under ISA conditions specifying standard atmosphere.

Such performance is highly exceptional in comparison with the performance of a conventional helicopter such as the Applicant's AS 332 MKII type, even though its performance is already remarkable, specifically, for the same tonnage: a recommended cruising speed of 141 kt for a similar range, and a fast cruising speed of 153 kt.

According to the invention, a hybrid helicopter with long range and high forward speed and having the following main elements:
- an airframe, i.e. the general structure of the vehicle, comprising in particular:
  - a fuselage;
  - a lift-providing surface secured to the fuselage; and
  - stabilizing and maneuvering surfaces, namely for pitch:
    - a horizontal stabilizer with at least one pitch control surface movable relative to the front portion or "horizontal plane"; and for steering: at least one suitable stabilizer; and an integrated drive system constituted by:

a mechanical interconnection system between firstly a rotor with collective pitch and cyclic pitch control of the blades of said rotor, and secondly at least one solely-propulsive propeller with collective pitch control of the blades of said propeller; and at least one turbine engine driving the mechanical interconnection system;

is remarkable in that the outlet speeds of rotation of said at least one turbine engine, of said at least one propeller, of said rotor, and of said mechanical interconnection system are mutually proportional, the proportionality ratio being constant regardless of the flight configuration of the hybrid helicopter under normal operating conditions of the integrated drive system.

It can thus be understood that if the hybrid helicopter has only one turbine engine, it rotates the rotor and the propeller(s) via the mechanical interconnection system. If the hybrid helicopter is fitted with two or more turbine engines, the rotor and the propeller(s) are then driven in rotation via the mechanical interconnection system by said turbine engines.

In other words, the power transmission system operates without any variable rotation ratio between the turbine engine(s), the propeller(s), the rotor, and the mechanical interconnection: system.

Consequently, and advantageously, the rotor is always driven in rotation by the turbine engine(s), and always develops lift whatever the configuration of the vehicle.

More precisely, the rotor is designed to provide all of the lift of the hybrid helicopter during takeoff, landing, and vertical flight stages, and then to provide part of the lift during cruising flight, with the wing of the lift-providing surface then contributing in part to supporting said hybrid helicopter.

Furthermore, and as described in greater detail below, it is important to observe that the hybrid helicopter's ability to reach high forward speeds makes it necessary to reduce the speed of the air flow at the tips of the advancing blades of the rotor in order to avoid any risk of compressibility phenomena in said air flow. In other words, it is necessary to reduce the speed of rotation of said rotor without increasing its mean lift coefficient, thus leading to a reduction in the lift provided by the rotor.

Thus, the rotor delivers part of the lift to the hybrid helicopter in cruising flight, possibly also with a small contribution to propulsion or traction forces (acting as a helicopter) or without any contribution to drag (acting as an autogyro). These conditions of operation thus lead to less power being delivered for the purpose of enabling the rotor to provide traction. It should be observed that a small contribution to propulsion forces is made by the rotor disk being tilted towards the front of the vehicle by a small amount only. This process degrades the lift/drag ratio of the rotor very little so it is consequently more advantageous in terms of power balance than an additional demand for thrust delivered by the propeller(s).

To do this in cruising flight, the wing provides the additional lift required.

Advantageously, the wing is made up of two half-wings, located on either side of the fuselage. These half-wings can constitute a high wing, in which case they preferably present a negative dihedral angle. Nevertheless, they could also constitute either a low wing, preferably having a positive dihedral angle, or indeed an inter-mediate wing of any dihedral angle. The shape of these half-wings in plan view may correspond, depending on the variant, to half-wings that are rectangular tapered, forward-swept, swept-back, . . . . Favorably, the span of the total wing lies in the range 7 m to 9 m for a vehicle having a maximum authorized takeoff weight of about 8 t.

In a preferred version, the total span of the wing is substantially equal to the radius of the rotor, i.e. substantially equal to 8 m, the chord of the wing being set at 1.50 m, i.e. giving an aspect ratio of about 5.30.

In a variant of the invention, the wing is fitted with ailerons.

Preferably, the hybrid helicopter is fitted with two propulsive propellers located on either side of the fuselage, advantageously at the ends of the two half-wings. To provide the required performance for the vehicle, each propeller has a diameter possibly, but not necessarily, lying in the range 2.5 m to 4.5 m, with the diameter of the propellers being 2.6 m in a particular version that has been studied, as explained below.

Naturally, since the rotor is always driven mechanically by the turbine engine(s) the rotor produces an "opposing rotor torque" tending to make the fuselage turn in the opposite direction to the rotor. In general, manufacturers install an antitorque rotor at the rear of the fuselage in order to compensate for the rotor torque. This antitorque rotor in a conventional helicopter is situated behind the fuselage at a distance of about 1.25 times the radius of the main rotor, so as to avoid any mechanical interference between them. Such a rotor generally requires about 12% of the power of the main rotor in vertical flight. In addition, the thrust from said rotor is also used for steering the helicopter.

Advantageously, the hybrid helicopter of the invention does not have an antitorque rotor, so as to simplify its mechanical assemblies and so as to reduce the weight and the cost of the vehicle, accordingly.

Under such circumstances, the hybrid helicopter is fitted with at least two propellers, installed on respective half-wings on either side of the fuselage, with the antitorque and steering control functions being performed by causing the propellers to exert differential thrust.

It can be observed that the propellers can be located substantially in alignment relative to the chord plane of the wings or half-wings, or they can be offset either above or below the wings or half-wings to which they are connected by a supporting mast.

In other words, in vertical flight, the propeller on the left of the fuselage exerts thrust towards the rear of the vehicle (or "reverse thrust"), while the propeller on the right produces thrust towards the front (or "forward thrust"), assuming that the rotor is turning counterclockwise when seen from above.

However, the wing span is advantageously of the same order of magnitude as the radius of the rotor, i.e. as small as possible because of the high lift/drag ratio of the rotor in cruising flight, as explained below. As a result the distance between the two propellers is also of the same order of magnitude as the radius of the rotor. Under such conditions, the thrust from the propellers is necessarily greater than that from an antitorque rotor.

In addition, and on the basis of the geometrical data given above by way of example, the diameter of the propellers must be reduced from 3.0 m for a conventional helicopter to about 2.6 m for the hybrid helicopter so as to allow sufficient space between said rotor and said propellers, thereby further increasing the power needed for the antitorque function.

In any event, this penalty in terms of power is easily compensated by the large power margin in vertical flight (see below) and by the savings in weight and cost that result from omitting the antitorque rotor and the associated power transmission system as represented by horizontal and sloping power transmission shafts and gearboxes known as the "intermediate" and the "rear" gearboxes.

In a variant, the antitorque function can also be implemented in such a manner that, in the above example, the right propeller develops twice the thrust while the left propeller does not provide any thrust it being understood that under the action of cyclic pitch the rotor must then be tilted towards the rear of the vehicle in order to balance the thrust from the right propeller. Under such circumstances, it can be shown that the power required is greater than that needed when the two propellers deliver thrust in opposite directions.

Naturally, it will be understood that an intermediate solution could correspond to an antitorque function being performed by combining the above two concepts (pure differential thrust or double thrust with no thrust).

Another advantage of the invention stems from the fact that the speed of rotation of the rotor is equal to a first speed of rotation $\Omega 1$ up to a first flightpath airspeed V1 of said hybrid helicopter, and is then reduced progressively in a linear relationship as a function of the forward speed of the vehicle. If the speed of rotation of a rotor of radius R of a hybrid helicopter traveling with a flightpath airspeed V is written $\Omega$, then the resultant speed of the air at the end of the advancing blade is V+U at the tip of the blade having a speed U equal to $\Omega R$. Under such conditions, the slope of said linear relationship is advantageously equal to $(-1/R)$ in a coordinate system in which speed V is plotted along the abscissa and speed of rotation $\Omega$ up the ordinate. The Mach number at the tip of the advancing blade is then kept constant.

In practice, the speed of rotation of the rotor is reduced progressively down to a second speed of rotation $\Omega 2$ corresponding to a second flightpath airspeed V2 that is the maximum speed of the hybrid helicopter.

Nevertheless, it will be understood that the hybrid helicopter can fly in cruising flight at a flightpath airspeed that is arbitrary, providing it is less than or equal to the maximum flightpath airspeed, such that the speed of rotation $\Omega$ of the rotor is equal to its first speed of rotation below V1, and is then determined by the above linear relationship between V1 and the second flightpath airspeed or maximum speed V2.

Consequently, this process makes it possible in particular to maintain the Mach number at the advancing outer ends of the rotor blades at a value that is no greater than 0.85, referred to below as the maximum Mach number. This value is set so as to remain always below the drag divergence Mach number at which the drag of the rotor increases considerably, thereby affecting the lift/drag ratio of the vehicle and consequently its performance, while generating vibration that is penalizing in terms of comfort, safety, and lifetime of the components of said vehicle.

The speed of rotation of the rotor of a rotorcraft is conditioned by the diameter of the rotor because the speed at the tip of a blade is limited by the person skilled in the art to a speed lying in the range 200 meters per second (m/s) to 250 m/s in order to avoid degrading the aerodynamic performance of said rotor.

The airspeed of the tip of the "advancing" blade is equal to the airspeed due to the forward speed of the rotorcraft plus the airspeed U due to the rotation of the rotor.

Consequently, and at a given speed of rotation of the rotor, any increase in the forward speed of the rotorcraft leads to a proportional increase in the Mach number, equal to the speed at the blade tip divided by the speed of sound. As stated above, it is appropriate to maintain the Mach number less than or equal to the drag divergence Mach number for the tip profile corresponding to the appearance of compressibility effects in the air flow at the blade tip leading to the above-mentioned drawbacks.

By way of example and on the basis firstly of a maximum Mach number set at 0.85 and secondly a speed of 220 m/s at the blade tip due to the rotation of a rotor having a diameter of 16 m in hovering flight, it is found that the Mach number of the advancing blade reaches 0.85 when the rotorcraft is advancing at a speed equal to 125 kt and at an altitude of 1500 m, under ISA temperature conditions, i.e. 5° C.

It can thus be understood, that since the intended maximum speed of advance is well above that value, e.g. 220 kt, it is important to remedy any increase in Mach number above 0.85.

According to the invention, it is thus proposed from about 125 kt to reduce progressively the speed of rotation of the rotor from the first speed of rotation $\Omega 1$ of said rotor to its second speed of rotation $\Omega 2$ in order to limit the airspeed at the tip of the advancing blade, e.g. to 171 m/s at a flightpath airspeed of 220 kt, so as to maintain the Mach number at the tin of the advancing blade at 0.85.

Naturally, this reduction in the speed of rotation of the rotor is accompanied by a drop in the lift of said rotor. Consequently, the wing compensates for this drop in lift so as to contribute 31% of the lift at 220 kt, as mentioned above in the context of a particular example application.

It should also be observed that the wing generates lift regardless of the forward speed of the rotorcraft, except when hovering in which case it presents a peculiar effect of "negative lift" associated with aerodynamic interaction between the rotor and said wing.

Consequently, the lift from the rotor in cruising flight is advantageously controlled by a suitable, preferably-automatic device for controlling the collective pitch while complying with the speed of rotation of the rotor using reference values ranging to said speed of rotation of the rotor.

Under such conditions, and for the particular version under study, the speed of rotation $\Omega$ of the rotor is equal to a first speed of rotation $\Omega 1$ of about 260 revolutions per minute (rpm) up to the first forward speed, more correctly referred to as a first flightpath airspeed V1, of about 125 kt. Above that speed and up to a second flightpath airspeed of about 220 kt, the speed of rotation of the rotor is reduced progressively to a second speed of rotation $\Omega 2$ of about 205 rpm.

Preferably, the following values are thus used:
first speed of rotation $\Omega 1$ of the rotor: 263 rpm;
second speed of rotation $\Omega 2$ of the rotor: 205 rpm.
first flightpath airspeed V1: 125 kt; and
second flightpath airspeed V2: 220 kt.

This preferred solution corresponds to a maximum lift/drag ratio of the rotor of about 12.2 in the range 150 kt to 220 kt, with the lift/drag ratio of the rotor and the wing taken together exceeding 12 above 150 kt.

Consequently, it is ensured that the Mach number at the tips of the advancing blades is less than 0.85 up to the first flightpath airspeed and is then maintained constant and equal to 0.85 between the first and second flightpath airspeeds.

It can readily be understood that because of the constant proportionality ratio between the speeds of rotation of the various components making up the integrated drive system, that the turbine engine(s), the propeller(s), the rotor, and the mechanical interconnection system likewise operate at respective first speeds of rotation and at respective second speeds of rotation. In other words, first and second speeds of rotation are defined relating respectively to the first and second flightpath airspeeds, and they are applicable to the turbine engine(s), to the propeller(s), and to the mechanical interconnection systems it should be observed that these second speeds of rotation correspond to 78% of the first speeds of rotation (nominal speeds: 100% of the first speeds of rotation) in the application described above.

Naturally, the speeds of rotation of the turbine engine(s), of the propeller(s), and of the mechanical interconnection system are reduced progressively between their respective first and second speeds of rotation, to comply with the variation in the speed of rotation of the rotor between its first and second speeds of rotation in application of a relationship that is linear or substantially linear.

In this context, it should be recalled that under no circumstances is any use made of variable ratios in speeds of rotation between the engine installation, the rotor, the propeller(s), and the various components of the integrated drive system.

Naturally, the collective pitch and the cyclic pitch of the rotor blades are adapted to match the varying speed of rotation of the rotor, as a function of the flightpath airspeed of the vehicle.

Similarly, the collective pitch of the propellers is controlled automatically in order to deliver the necessary thrust.

During cruising flight, another advantage of the invention consists in controlling the longitudinal cyclic pitch of the rotor so as to maintain the attitude of the fuselage at a pitch angle (or longitudinal trim angle) that is equal to the slope of the flightpath, so as to reduce the angle of incidence of the fuselage relative to the air to zero, thereby minimizing the drag of said fuselage. Consequently, and during level cruising flight, the longitudinal trim of the hybrid helicopter is maintained at a value of zero. Furthermore, and advantageously, the tilting moment of the fuselage is also adjusted by operating at least one moving pitch control surface fitted to the horizontal stabilizer, e.g. by means of an electric actuator, so as to compensate for any offset in the center of gravity of said hybrid helicopter: this adjustment is obtained in theory when the bending moment exerted on the rotor mast relative to the pitch axis, and as measured by strain gauges, for example, is reduced to zero.

It is advantageous to be able to adjust or even reduce to zero the tilting moment of the fuselage, since firstly that acts directly on the bending moment in the rotor mast and thus on the fatigue stress it suffers, and secondly that leads to overall balance of the vehicle resulting from the distribution of power between the propellers and the rotor. This distribution has an influence on the overall power balance, since the propellers and the rotors have respective different efficiencies.

During this operation, the distribution of power between the rotor and the propellers can vary significantly as a function of the angle of inclination of the rotor disk because of its contribution to variations in total drag and in the propulsion of the vehicle. By way of example, the power needed in high speed cruising flight is due mainly to the parasitic drag of the vehicle. At 140 kt, parasitic power represents approximately 50% of the total power requirements and can reach 75% at 220 kt, i.e. three times the power needed for lift. Efficiency at high speed thus depends on minimizing parasitic drag.

The hybrid helicopter is also innovative in that it has first means for controlling, optionally automatically, the angle at which said at least one pitch control surface is set as a function of the bending moment exerted on the rotor mast relative to the pitch axis of said hybrid helicopter, and second means for controlling the cyclic pitch of the blades of said rotor so as to control the longitudinal trim of the hybrid helicopter as a function of flight conditions.

It will readily be understood that such control is made possible by the two degrees of freedom provided by varying at least one pitch control surface and secondly by controlling the cyclic pitch of the rotor blades, these first and second means being independent of each other.

In practice, the pitch control surface cane be adjusted manually in a simplified version. It is then necessary to provide the instrument panel with an indicator of the bending moment exerted on the rotor mast so as to enable the pilot to keep it within a determined range by acting manually on said movable pitch control surface, or indeed on the electric actuator.

When the pitch control surface is operated automatically in an improved version, said first means respond by automatically controlling the angle at which said at least one pitch control surface is set via an electric actuator for example, thereby adjusting the tilting moment of said hybrid helicopter to a first setpoint value that is preferably equal to zero.

These first means comprise a computer that controls an electric actuator turning said at least one pitch control surface through a deflection angle that adapts the tilting moment of the hybrid helicopter to said first setpoint value.

To do this, said computer determines the bending moment exerted on the rotor mast relative to the pitch axis as deduced from information delivered by sensors, said computer ceasing to move said pitch control surface when the bending moment exerted on the rotor mast lies within a predetermined range corresponding substantially to the first setpoint value, preferably equal to zero, for the pitching moment of said hybrid helicopter.

In other words, the term "first setpoint value for the pitching moment" can designate equally well a specific value or a narrow range of values for said pitching moment, in particular because of the dependency of the bending moment exerted on the rotor mast relative to the pitching moment of the hybrid helicopter.

In addition, since the pitching moment is controlled and preferably reduced to zero, it is also appropriate to control the longitudinal trim of the hybrid helicopter and in particular to reduce it to zero in order to minimize parasitic drag. The second means thus adapt said longitudinal trim to a second setpoint value, preferably equal to zero. These second means comprise at least a cyclic pitch stick that controls the cyclic pitch, in particular the longitudinal cyclic pitch of the rotor blades via a swashplate and pitch levers.

Naturally, it should be recalled that the lateral cyclic pitch is also involved to enable the vehicle to perform yaw maneuvers, with variations in the collective pitch of the rotor blades serving only to vary the lift of each blade by the same amount.

Naturally, the stabilizer for providing yaw control of the hybrid helicopter may advantageously comprise in front a non-moving portion or fin, and at the rear a moving portion or rudder. Clearly, the vehicle can be fitted with a plurality of stabilizers that are substantially vertical or possibly inclined relative to the vertical, each provided with a rudder.

These various functions described above are made possible by a mechanical interconnection system suitable for transmitting power. Such a system must be capable of transmitting high levels of torque, in particular because of the high level of power absorbed and the relatively low speed of rotation of the rotor. This requires large reduction ratios in speed of rotation between the various components of the drive system, while maintaining a weight that is as small as possible and ensuring good endurance and good overall safety.

In practice, the mechanical interconnection system comprises the following main components:
  a first main gearbox situated in the fuselage for driving the rotor at, 263 rpm at the nominal speed of rotation (100% of the first speed of rotation of the rotor), or the first speed of rotation of the rotor;

two second gearboxes for driving the propellers, one gearbox driving each propeller at 2000 rpm at the nominal speed of rotation, or first speed of rotation for each propeller;

a first shaft, driven by the first gearbox, for driving the rotor;

two second shafts, each being disposed in a respective half-wing, substantially at one-fourth of its chord, and delivering power to the rotor and to the propellers, the speed of rotation of these shafts also being 3000 rpm at the nominal speed of rotation or first speed of rotation of the second shafts; and both second shafts are driven by one or more turbine engines by one or more associated modules which, depending on the type of turbine engine, reduce the turbine engine speed from 21,000 rpm or from 6000 rpm to 3000 rpm for the first speed of rotation of said shafts.

This architecture remains valid for turbine engines whether mounted on the fuselage or on the half-wings. If mounted on the half-wings, each speed reduction module is incorporated in the second gearboxes for the corresponding propeller instead of being disposed on either side of the first main gearbox.

In a basic version, the first main gearbox has two stages, namely:

a spiral bevel toothed ring driven by two bevel gears, each connected to one of said second shafts; and said ring acting at the first speed of rotation of the installation to drive at 1000 rpm the sunwheel of an epicyclic stage so as to rotate the rotor via planet wheels rotating on a stationary outer ring.

The two associated modules comprise one or two reduction stages depending on the outlet speeds of rotation of the turbine engine. In general, a single stage suffices for a turbine engine outlet speed of 6,000 rpm, whereas two stages are necessary for an outlet speed of 21,000 rpm.

Furthermore, the two second gearboxes are fitted with respective speed reduction stages, since the first speed of rotation of the propellers (nominal speed of rotation) is about 2,000 rpm.

Naturally, the number of turbine engines is not limiting.

BRIEF DESCRIPTION OF THE DRAWINGS

The invention and its advantages appear in greater detail in the context of the description below of embodiments given by way of illustration and with reference to the accompanying figures, in which.

MORE DETAILED DESCRIPTION

Figure 1:
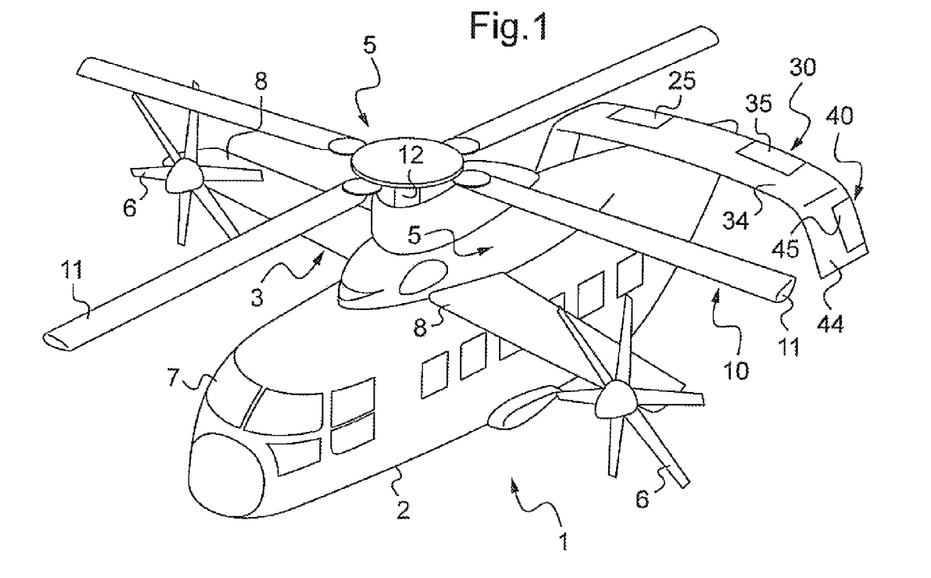
FIG. 1 is a diagrammatic perspective view of an embodiment of a hybrid helicopter of the invention.

In FIG. 1, there can be seen a hybrid helicopter 1 made in accordance with the invention.

In the usual way, the hybrid helicopter 1 comprises a fuselage 2 with a cockpit 7 at the front thereof, a rotor 10 for driving blades 11 in rotation by means firstly of two turbine engines 5 disposed on top of the fuselage 2 (not visible in FIG. 1 because of the presence of fairing), on either side of the longitudinal plane of symmetry of the rotorcraft, and secondly a main first gearbox MGB (not shown in FIG. 1).

Furthermore, the hybrid helicopter 1 is provided with a high wing 3 made up of two half-wings 8 disposed on top of the fuselage 2, these half-wings 8 being substantially rectangular in plane view and presenting a negative dihedral angle.

The hybrid helicopter 1 is propelled by two propellers 6 driven by the two turbine engines 5, one propeller 6 being disposed at each of the outer ends of the wing 3.

Furthermore, in the vicinity of the rear end of the fuselage 2, surfaces are provided for stabilizing and maneuvering purposes, i.e. for pitch control a horizontal stabilizer 30 having two pitch-control surfaces 35 that are movable relative to the front portion 34, and for steering two appropriate stabilizers 40, each located at a respective end of the horizontal stabilizer 30.

Specifically, the horizontal stabilizer 40 and the vertical stabilizers 50 form a U-shape that is turned upside-down towards the fuselage 2.

Advantageously, the stabilizers 40, which are vertical or inclined relative to the vertical, can be constituted by respective non-moving front portions (or fins) 44 and moving rear portions or rudders 45 for yaw control.

From a dimensional point of view, the hybrid helicopter 1 presently corresponds to the following characterstics, relating to a rotorcraft of about 8 t maximum weight authorized for takeoff:

rotor diameter D: about 16 m;
propeller diameter d: 2.6 m;
wing span L: 8 m; and
aspect ratio $\lambda$ of the wing: 5.3.

Figure 2:
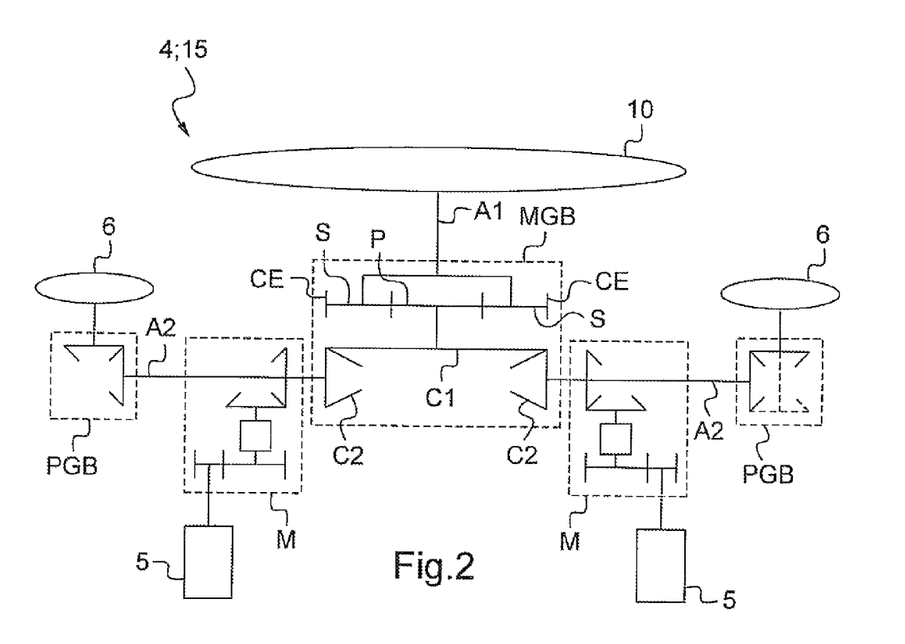
FIG. 2 is a diagrammatic view of the drive system.

In addition, the hybrid helicopter 1 is fitted with an integrated drive system 4 that comprises not only the two turbine engines 5, the rotor 10, and the two propellers 6, but also a mechanical interconnection system 15 between these elements as shown diagrammatically in FIG. 2, which is a simplified representation in which it should be understood that the rotor 10 and the propellers 6 rotate in planes that are substantially orthogonal and not parallel.

With this configuration, the hybrid helicopter 1 is remarkable in that the speeds of rotation of the turbine engine outlets, of the propellers, of the rotor, and of the mechanical interconnection system are mutually proportional, with the proportionality ratio being constant under normal conditions of operation of the integrated drive system, regardless of the flight configuration of the hybrid helicopter.

Naturally, special devices lying outside the ambit to the invention are activated in the event of possible mechanical breakdowns.

With reference to FIG. 2, the mechanical interconnection system comprises the following main components:

a first or main gearbox MGB situated in the fuselage 2 and driving the rotor 10 at 263 rpm at the nominal speed of rotation (or the first speed of rotation of the rotor);

two second gearboxes PGB, each of the gearboxes PGB driving one of the propellers 6 at 2,000 rpm at the nominal speed of rotation;

a first shaft A1 rotated by the first gearbox MGB for driving the rotor 10;

two second shafts A2, each disposed in a respective one of the half-wings 8, substantially at one-fourth of the chord, and delivering power to the rotor and to the propellers 6, the speeds of rotation of the shafts also being 3,000 rpm at the nominal speed of rotation or first speed of rotation of the second shafts;

the two second shafts A2 are driven in rotation by the two turbine engines 5 via two associated modules M that, depending on the type of turbine engine, reduce the speeds of the turbine engines 5 from 21,000 rpm or from 6,000 rpm to 3,000 rpm for the first speed of rotation of said shafts.

In a basic version, the first or main gearbox MGB has two stages, namely:

a spiral bevel toothed ring C1 driven by two bevel gears C2, each connected to one of said second shafts A2; and said ring C1 operating at the first speed of rotation of the installation to drive the sunwheel P of an epicyclic stage at 1,000 rpm so as to put the rotor into rotation via planet gears S rotating on a stationary outer ring CE.

The various above dispositions give the hybrid helicopter 1 the following other characteristics:

a lift/drag ratio for the rotor of about 12.2 for a flightpath airspeed greater than 150 kt;

a lift/drag ratio F for the rotor and the wing together of about 12, for a flightpath airspeed greater than 150 kt;

a maximum speed for the vehicle: 220 kt; and rotor lift: 1.05 times the weight of the helicopter in vertical flight and lying in the range 0.6 to 0.9 times said weight at the maximum flightpath airspeed, the rotor 10 being driven continuously by the turbine engine 5 with power absorption in cruising flight being reduced to about 500 kW.

Preferably, it should be observed that the ratio of lift of the rotor 10 to weight of the hybrid helicopter 1 takes on successively the following intermediate values:

0.98 at 50 kt;
0.96 at 80 kt;
0.90 at 125 kt;
0.85 at 150 kt; and
0.74 at 200 kt.

In addition, the hybrid helicopter 1 is such that the collective pitch and the cyclic pitch of the blades 11 of the rotor 10 are controlled and adapted as a function of flight conditions.

Concerning the propellers 6, only collective pitch is controlled and adapted as a function of flight conditions.

Furthermore, the hybrid helicopter 1 is adjusted to high-speed cruising flight so that the rotor 10 exerts lift possibly with a small contribution to the propulsion forces but without any contribution to drag. Naturally, this requires power to be absorbed by said rotor 10 to balance the torque generated by the profile drag and the induced drag of the blades 11 of the rotor 10, but this power is relatively small, i.e. about 500 kilowatts (kW) as mentioned above, because of the lift/drag ratio f of the rotor which is about 12.2 above 150 kt.

The small contribution to propulsion forces occurs because of the rotor disk being tilted a little towards the front of the rotorcraft, which solution can be more favorable in terms of power balance than additional thrust from the propellers because the lift/drag ratio of the rotor is relatively insensitive to small variations in the trim of the hybrid helicopter.

Furthermore, it is advantageous to be able to adjust the pitching moment of the fuselage since firstly it acts directly on the bending moment in the rotor mast and thus on the fatigue stressing thereof, and secondly gives rise to the overall balance of the rotorcraft as a result of the way power is distributed between the propellers and the rotor. This distribution has an influence on the overall power balance since the propellers and the rotor have different respective efficiencies.

Figure 3:
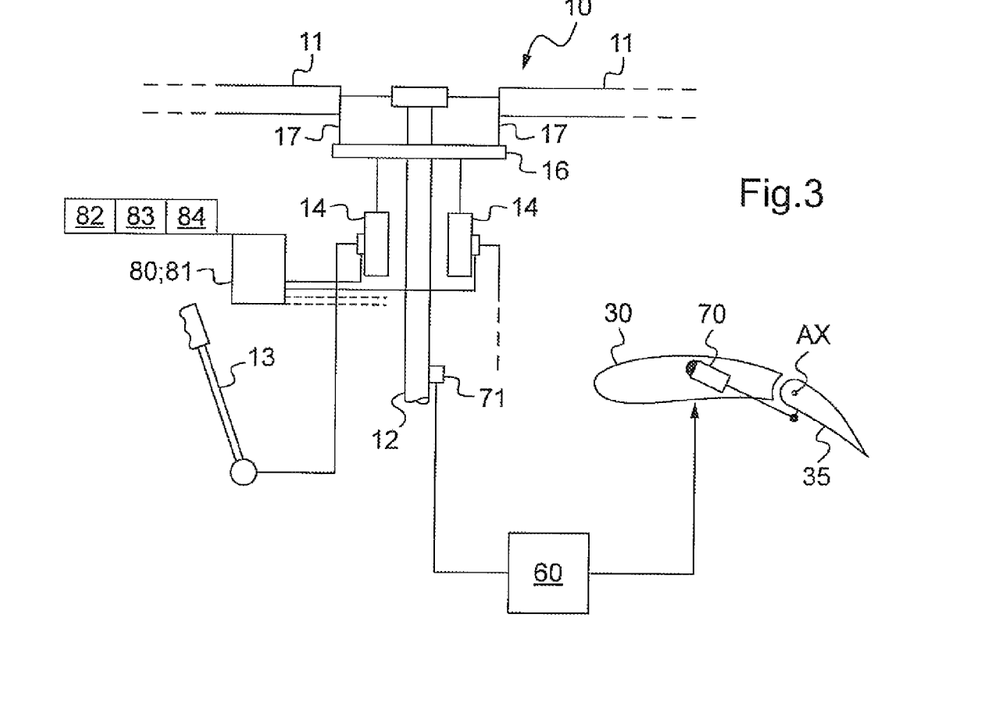
FIG. 3 is a diagram of the device for adjusting the longitudinal trim of the hybrid helicopter.

As a result and as shown in FIG. 3, the preferably automatic maneuvering of at least one movable pitch-control surface 35 fitted to the horizontal stabilizer 30 under drive from an electric actuator 70 makes it possible to adjust or even eliminate any pitching moment that results from the center of gravity becoming offset relative to the lift line of action of said hybrid helicopter: this adjustment is obtained when the bending moment of the rotor mast 12 relative to the pitch axis, and as measured by strain gauges 71, for example, reduces to zero. In general, this adjustment is relatively slow so that such an actuator is often called a trim actuator.

In addition, and independently, the longitudinal cyclic pitch of the rotor 10 is controlled as a function of flight conditions to control the attitude of the fuselage. Preferably, a longitudinal trim angle is maintained that is equal to the slope of the flightpath, so as to reduce the angle of incidence of the fuselage, and thereby minimizing the drag of the fuselage. Consequently, the longitudinal trim of the hybrid helicopter 1 is maintained at a value of zero during a level cruising flight.

In practice, the pitch-control surface 35 can be controlled manually in a simplified version. It is then necessary to provide an indicator on the instrument panel to indicate the bending moment being exerted on the rotor mast 12, which bending moment the pilot must then keep within a determined range by acting manually on said movable pitch-control surface 35 or indeed on the electric actuator 70.

When the pitch-control surface 35 is maneuvered automatically in an improved version, the electric actuator 70 is controlled by a computer 60 that determines the bending moment exerted on the rotor mast 12, as deduced from information delivered by sensors 71, preferably strain gauges disposed on said rotor mast 12. In this way, the computer 60 ceases to move said at least one pitch-control surface 35 about its axis AX when the bending moment exerted on the rotor mast relative to the pitch axis lies within a predetermined range corresponding substantially to the first setpoint value, for the pitching moment of said hybrid helicopter 1, which value is preferably equal to zero.

As a result, the computer 60, the electric actuator 70, and the sensors 71 constitute first means for automatically controlling the deflection angle at which said at least one pitch-control surface 35 is set as a function of the bending moment exerted on the rotor mast 12 relative to the pitch axis of the hybrid helicopter 1. Naturally, it is possible to use a plurality of control surfaces 35 for this operation.

Independently, second means 13, 14, 16, 17 control the cyclic pitch of the blades 11 of the rotor 10 so as to control the longitudinal trim of the hybrid helicopter 1 as a function of flight conditions, adapting it to a second setpoint value relating to said longitudinal trim.

Advantageously, said second setpoint value therefore corresponds to a longitudinal trim angle equal to the slope of the flightpath of the rotorcraft, as mentioned above.

Consequently, this second longitudinal trim value is equal to zero during level flight of the hybrid helicopter 1.

Said second means comprise a cyclic pitch stick 13 that controls servo-controls 14 for imparting the cyclic pitch to the blades 11 of the rotor 10 via a swashplate 16 and pitch levers 17.

In practice, it turns out the pilot can use an artificial horizon for ensuring maintaining a zero longitudinal trim in level flight by using the second means 13, 14, 16, 17.

In contrast, an appropriate system needs to be implemented when an arbitrary slope is required on the flightpath.

For this purpose, said second means are associated with a device 80 for automatically servo-controlling the longitudinal trim of the hybrid helicopter 1, this automatic servo-control device 80 being integrated in an autopilot 81 and specifically comprising a global positioning system (GPS) 82 for determining said flightpath slope and an attitude and heading reference system (AHRS) 83 for defining the trim of the hybrid helicopter 1 in such a manner as to deduce therefrom the angle of incidence of the fuselage of said hybrid helicopter 1 relative to the flow of air and to make it zero, together with an anemometer installation 84 for correcting errors associated with wind.

This adjustment operation consists in properly positioning the fuselage 2 and the rotor 10 at an angle of incidence that is substantially zero relative to the flow of air, so as to achieve minimum overall drag and maximum lift/drag ratio. Compared with operating in autogyro mode, the balance is favorable, the reason being that for small variations of the longitudinal trim of the rotor, the lift/drag ratio of the rotor hardly varies. Consequently, the rotor is "pulled" without any change in overall efficiency.

From the point of view of flight mechanics, it is recalled that the rotor 10 serves to provide all of the lift of the hybrid helicopter 1 during stages of takeoff, landing, and vertical flight, and some of the lift during cruising flight, with the wing 3 then contributing to provide part of the lift for supporting said hybrid helicopter 1.

Naturally, since the rotor 10 is always driven mechanically by the turbine engine 5, this rotor 10 produces "resistive rotor torque" that tends to cause the fuselage 2 to turn in the opposite direction to the rotor 10.

The hybrid helicopter 1 of the invention does not have an antitorque rotor in order to simplify its mechanical assemblies, and consequently reduce the weight and the cost of the rotorcraft.

Consequently, since the hybrid helicopter 1 has two propellers 6, each installed on a half-wing 8 on either side of the fuselage 2, the steering control and antitorque functions are provided by making use of differential thrust, is the difference between the thrusts exerted by the propellers.

In other words, in vertical flight, propeller 6 on the left fuselage exerts thrust towards the rear of the rotorcraft ("rear thrust") while the propeller 6 on the right produces thrust towards the front ("front thrust"), assuming that the rotor 10 rotates anticlockwise when seen from above.

In a variant, the antitorque function may also be performed in such a manner that, on the above example, the right propeller 6 develops double thrust while the left propeller 6 does not provide any thrust, it being understood that the rotor 10 must then be inclined towards the rear of the rotorcraft in order to balance the thrust from the right propeller. Under such circumstances, it can be shown that more power is required than when the two propellers provide thrust in opposite directions.

Figure 4:
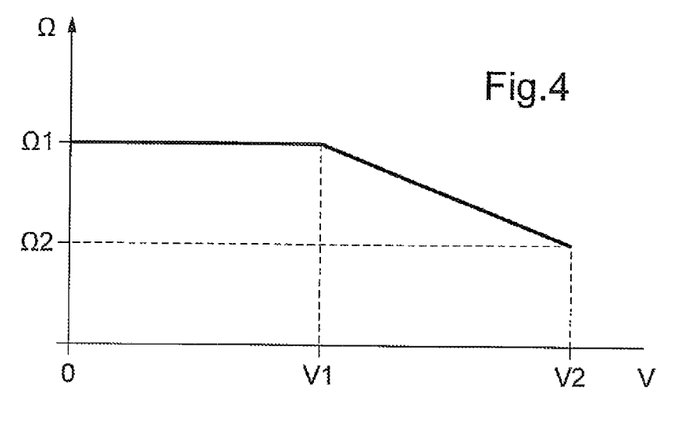
FIG. 4 is a diagram showing the relationship for variation in the speed of rotation of the rotor as a function of the forward speed of the hybrid helicopter; Elements present in two or more distinct figures are given the same reference in each of them.

Consequently, on the basis of the above-described example and of FIG. 4, the speed of rotation of the rotor 10 is equal to a first speed of rotation $\Omega 1$ of 263 rpm up to a first forward speed, more correctly referred to as a first flightpath airspeed V1, of 125 kt. At higher speeds and up to a second flightpath airspeed V2 of 220 kt, the speed of rotation of the rotor is reduced progressively to a second speed of rotation $\Omega 2$ of 205 rpm. The progressive reduction in the speed of rotation of the rotor 10 between the first and second flightpath speeds varies in application of a linear relationship of slope $(-1/R)$ where R is the radius of the rotor, and in a coordinate system where speed V is plotted along the abscissa and speed of rotation $\Omega$ of the rotor (10) is plotted up the ordinate.

The person skilled in the art knows that if airspeed increases, the Mach number at the end of the advancing blade of a rotorcraft rotor reaches the Mach number known as the "drag-divergence" Mach number.

Then, at a maximum Mach number that is less than or equal to the so-called drag-divergence Mach number of the end profile of the blade, the speed of rotation of the rotor needs to reduced progressively as a function of the increase in the forward speed of the rotorcraft so as to avoid exceeding that limit.

If the speed of sound is written c, the Mach number at the end of the advancing blade is equal to the expression $(V+U)/c$ or indeed $(V+\Omega R)/c$. Imposing a maximum Mach number equal to Mm amounts to causing $\Omega$ to vary in application of the following linear relationship $[(c \cdot Mm-V)/R]$.

Assuming that the maximum Mach number is equal to 0.85 and a peripheral airspeed at the blade tip of 220 m/s in vertical flight (speed of rotation of the rotor 263 rpm), the Mach number of the advancing blade reaches 0.85 at a flightpath airspeed of 125 kt at an altitude of 1500 meters under ISA conditions (outside temperature: 5° C.).

Over the range 125 kt to 220 kt, the speed of rotation of the rotor is adapted to comply with the above-specified relationship.

When the flightpath airspeed of the rotorcraft is 220 kt, the airspeed at the tip of the blade due to rotation is equal to 171 m/s (speed of rotation of the rotor: 205 rpm or 78% of the nominal speed of the rotation of the rotor) and the advance parameter $\mu$ is equal to 0.66. At this value for the advance parameter, the lift of the rotor cannot be maintained without a large increase in the chord of the blades (60% increase which would lead to a conventional four-blade helicopter having a chord of one meter), in order to maintain a mean blade lift coefficient Czm of less than 0.5 and thus avoid separation at the retreating blade. It is clear that such overdimensioning of the blades at a high forward speed would lead to a significant increase in the weight of the rotorcraft and to penalizing its performance. Consequently, the rotor of the hybrid helicopter 1, having a maximum authorized takeoff weight of about 8 t, is progressively taken over by a wing 3 of small span L that delivers lift of about 31% at 220 kt. Under such conditions, when the flightpath airspeed increases, the lift coefficient Czm of the blades, which in vertical flight is equal to 0.5 (wing lift contribution estimated at 4.5%), decreases to reach 0.43 at 125 kt because of the increase in lift from the wing 3, and it increases to reach a value of 0.54 at 220 kt because of the reduction in the speed of rotation of the rotor to 78% of its nominal speed of rotation. Under such conditions, the rotor operates with a maximum lift/drag ratio of about 12.2.

Finally, the general architecture of the hybrid helicopter 1 of the invention, associated with:

a constant proportionality ratio between the speeds of rotation of the turbine engines 5, of the rotor 10, of the propellers 6, and of the mechanical interconnection system 15, the drive system rotating at a first speed up to a first forward speed of the vehicle, and then decreasing to a second speed of rotation to a second forward speed equal to the maximum forward speed;

a device 70 for controlling and maintaining the longitudinal trim of the vehicle at a value of zero and without a tail rotor;

an integrated drive system 4; and a mechanical interconnection system 15, preferred over a jet-propelled rotor for better mechanical efficiency and less noise;

all contribute to obtaining high performance.

Thus, the hybrid helicopter 1 is characterized by exceptional versatility, enabling it to optimize the compromise between speed, range, and weight of the vehicle. By way of example, and with about 2 t of fuel, it is possible to obtain the following performance for a hybrid helicopter 1 weighing about 8 t and transporting 16 passengers:

hovering duration: 4.2 hours;

usable range at 220 kt: 511 n.miles; and usable range at the economic cruising speed of 125 kt: 897 n.miles.

Similarly, and still by way of example, a 400 n.mile mission at 20 kt can be performed with about 1.6 t of fuel and 20 minutes reserve.

These results demonstrate the large amount of flexibility and adaptability of the hybrid helicopter 1 and its advantages compared with a conventional helicopter. The cruising speed of conventional helicopter has only a minor influence on its fuel consumption during a mission, so its maximum cruising speed is relatively close to the economic cruising speed, such that the only option for increasing the usable range of the vehicle significantly is to reduce the number of passengers so that additional fuel can be taken on board.

Naturally, the present invention can be subjected to numerous variations as to its implementation. In particular, it is important to observe that the invention as described relates in particular to a hybrid helicopter weighing about 8 t in all. Nevertheless, the invention is applicable to any rotorcraft of arbitrary weight, for example from a low weight drone to a vehicle of very large tonnage. Although several embodiments are described above, it will be understood that it is not conceivable to identify exhaustively all possible embodiments. It is naturally possible to envisage replacing any of the means described by equivalent means without going beyond the ambit of the present invention.

What is claimed is:

1. A hybrid helicopter having a long range and a high forward speed, the helicopter comprising:
    an airframe made up of:
        a fuselage;
        a lift-providing surface secured to the fuselage; and
        stabilizing and maneuvering surfaces, namely for pitch:
            a horizontal stabilizer with at least one pitch control surface that is movable relative to a front portion of the stabilizer; and for steering: at least one suitable stabilizer; and
    an integrated drive system constituted by:
        a mechanical interconnection system between firstly a rotor of radius (R) with collective pitch and cyclic pitch control of the blades of said rotor, and secondly at least one propeller with collective pitch control of the blades of said propeller; and
        at least one turbine engine driving the mechanical interconnection system;
    wherein the outlet rotational speeds of said at least one turbine engine, of said at least one propeller, of said rotor, and of said mechanical interconnection system are proportional to one another regardless of the flight configuration of the hybrid helicopter under normal operating conditions of the integrated drive system such that the rotational speed of the rotor varies in relation to the rotational speed of the at least one turbine, and the rotational speed of the at least one propeller varies in relation to the rotational speed of the at least one turbine.

2. A hybrid helicopter according to claim 1, wherein the stabilizer comprises at the front a non-moving fin fitted with a movable steering rudder for providing the pilot with yaw control.

3. A hybrid helicopter according to claim 1, wherein said rotor firstly exerts all of the lift needed for takeoff, for landing, for hovering, and for flying vertically, and secondly always provides a fraction of the lift needed for cruising flight, said rotor being always driven in rotation by said at least one turbine engine, without participating in traction or in drag, with reduced absorbed power.

4. A hybrid helicopter according to claim 1, wherein said rotor firstly exerts all of the lift needed for takeoff, for landing, for hovering, and for flying vertically, and secondly always provides a fraction of the lift needed for cruising flight, said rotor being always driven in rotation by said at least one turbine engine, with reduced contribution to traction but no contribution to drag, and with reduced absorbed power.

5. A hybrid helicopter according to claim 3, wherein the lift developed by the rotor is about 1.05 times the weight of the hybrid helicopter for a flightpath airspeed of zero, and lies in the range 0.6 to 0.9 times the weight of the helicopter at maximum flightpath airspeed.

6. A hybrid helicopter according to claim 1, wherein the maximum flightpath airspeed is about 220 kt for a maximum authorized takeoff weight of the hybrid helicopter of about 8 t.

7. A hybrid helicopter according to claim 1, wherein the span of the wing made up of two half-wings is substantially equal to the radius (R) of the rotor.

8. A hybrid helicopter according to claim 1, wherein the wing is in the high position relative to the fuselage.

9. A hybrid helicopter according to claim 8, wherein the dihedral angle of the wing is negative.

10. A hybrid helicopter according to claim 1, wherein the wing is in the low position relative to the fuselage.

11. A hybrid helicopter according to claim 10, wherein the dihedral angle of the wing is positive.

12. A hybrid helicopter according to claim 1, wherein the wing is in an intermediate position between the high position and the low position.

13. A hybrid helicopter according to claim 7, wherein the aspect ratio ($\lambda$) of the wing is about 5.30.

14. A hybrid helicopter according to claim 1, wherein the lift/drag ration (f) of the rotor is about 12.2 for a flightpath airspeed greater than 150 kt.

15. A hybrid helicopter according to claim 1, wherein the lift/drag ratio (F) of the assembly comprising the wing and the rotor is about 12 for a flightpath airspeed greater than 150 kt.

16. A hybrid helicopter according to claim 1, wherein said hybrid helicopter is fitted with two propellers, each propeller being situated at an outside end of the wing.

17. A hybrid helicopter according to claim 1, wherein the collective pitch and the cyclic pitch of the blades of the rotor are controlled and adapted as a function of flight conditions.

18. A hybrid helicopter according to claim 1, wherein the collective pitch of the propellers is controlled and adapted as a function of flight conditions.

19. A hybrid helicopter according to claim 1, wherein the horizontal stabilizer and the vertical stabilizer together form an upside-down U-shaped unit relative to the fuselage.

20. A hybrid helicopter according to claim 1, wherein two turbine engines are disposed on the fuselage.

21. A hybrid helicopter according to claim 1, wherein two turbine engines are disposed on the wing, the turbine engine being located on either side of said fuselage.

22. A hybrid helicopter according to claim 1, wherein the antitorque function is performed by a single propeller.

23. A hybrid helicopter according to claim 1, wherein the antitorque function is performed by differential thrust between the two propellers, one exerting thrust towards the front and the other exerting thrust towards the rear of the hybrid helicopter.

24. The hybrid helicopter according to claim 1, wherein the at least one turbine has a first speed of rotation and a second speed of rotation under normal operating conditions.

25. The hybrid helicopter according to claim 1, wherein the mechanical interconnection system has at least one gearbox which directly connects the at least one propeller, the at least one turbine, and the rotor.

26. The hybrid helicopter according to claim 1, wherein the at least one turbine is capable of variable speeds of rotation under normal operating conditions.

\* \* \* \* \*